April 18, 1933.  E. G. SWANSON  1,904,565
ELECTRICAL APPARATUS
Filed Oct. 1, 1930  2 Sheets-Sheet 2
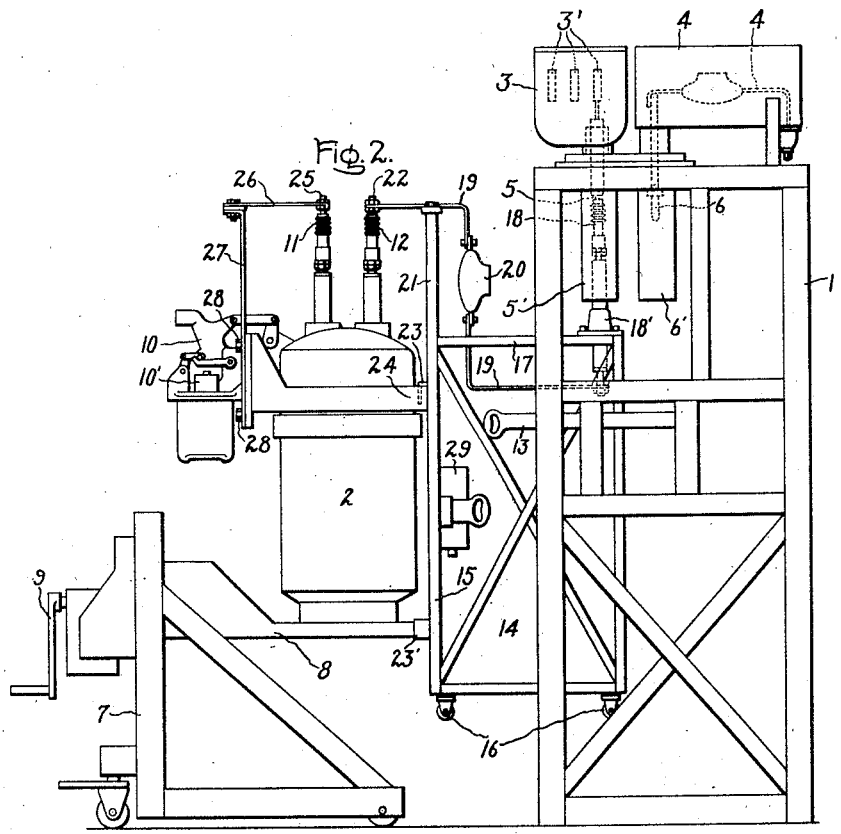
Inventor:
Ernest G. Swanson,
by Charles E. Tullar
His Attorney.

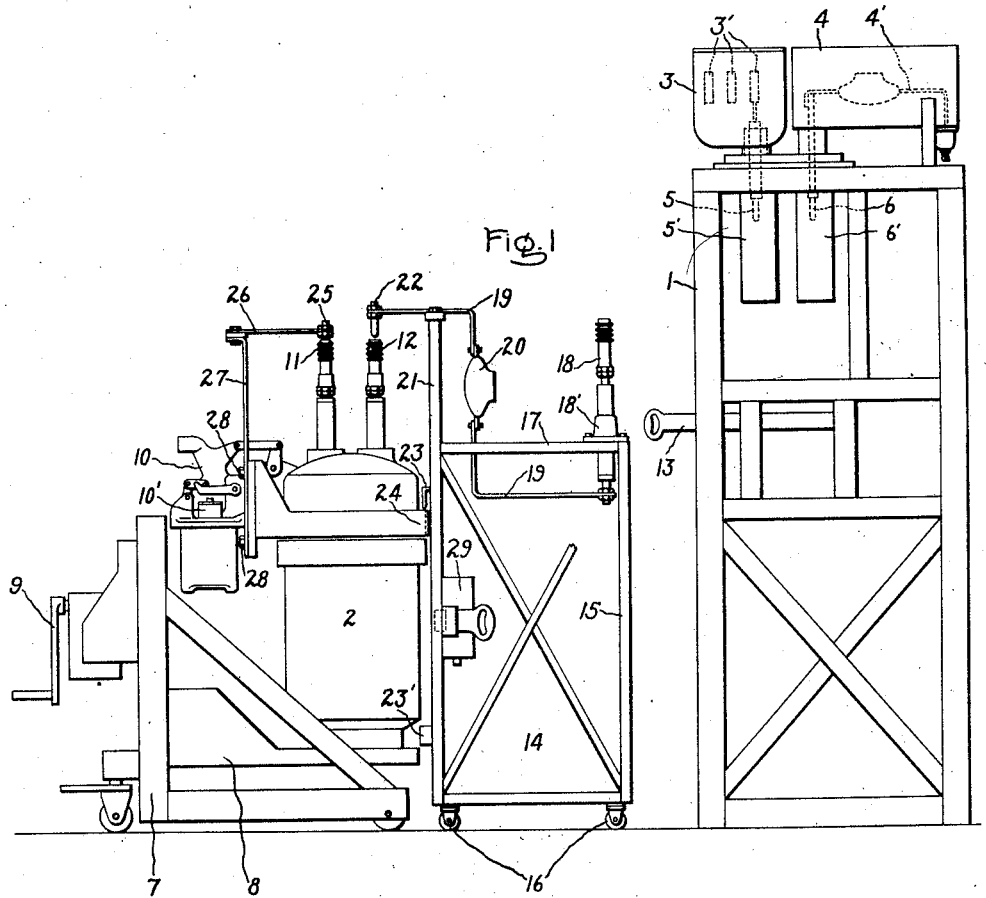

Patented Apr. 18, 1933

1,904,565

UNITED STATES PATENT OFFICE

ERNEST G. SWANSON, OF UPPER DARBY, PENNSYLVANIA, ASSIGNOR TO GENERAL ELECTRIC COMPANY, A CORPORATION OF NEW YORK

ELECTRICAL APPARATUS

Application filed October 1, 1930. Serial No. 485,684.

My invention relates to electrical apparatus and more particularly to means for grounding and testing main buses or feeder connections through a circuit breaker.

A principal object of my invention is an improved grounding and testing apparatus for metal clad switchgear, particularly of the drop-down type including a fixed superstructure for housing the main busbars and feeder connections and a switch unit vertically movable with respect thereto, which may be readily adjusted in the test position, and which shall be simple and rugged in construction and provide short circuit protection equivalent to the rated interrupting capacity of the switch unit.

My invention will be more fully set forth in the following description referring to the accompanying drawings, and the features of novelty which characterize my invention will be pointed out with particularity in the claims annexed to and forming a part of this specification.

Referring to the drawings, Fig. 1 is an elevational view of metal clad switchgear provided with test apparatus embodying my invention in the isolating and inoperative position thereof; Fig. 2 is an elevational view of the apparatus shown in Fig. 1 in the testing position thereof, and Fig. 3 is a diagrammatic illustration of circuit connections for the testing apparatus and associated circuits.

In Fig. 1 there is illustrated by way of example metal clad switchgear of the well known drop-down type comprising a stationary structure or frame 1 and a switch unit 2, as an oil circuit breaker of proper interrupting rating, adapted to be moved vertically within said structure to connected and disconnected positions. The frame 1 has mounted thereon a superstructure comprising the metallic trough-like housing 3 for the main buses 3' and a metallic housing 4 for the usual current transformers and feeder cable connections 4'. Each phase of the busbars within the housing 3, and the feeder connections in the housing 4, are electrically connected to the depending stationary disconnecting contacts 5 and 6 respectively which are mounted within the cylindrical insulating shields 5' and 6' open at their lower ends for receiving the movable disconnecting contacts of the movable switch unit 2. The above described connections are for a three-phase system, illustration of a single phase being sufficient due to similarity of the phase connections.

For the purpose of running the switch unit 2 into and out of the frame structure, and for elevating and lowering the same with respect to the fixed disconnecting contacts, there is provided suitable means, as the truck 7, having a vertically movable switch supporting member 8 and actuating means 9 for raising or lowering the same. The switch unit is likewise provided with a suitable operating means 10, including a trip coil 10', for controlling operation of the circuit breaker in a well known manner. During normal operation the truck 7 having mounted thereon the circuit breaker 2 is moved to a position within the frame so that the disconnecting contacts 11 and 12 mounted on the circuit breaker are directly below and in alinement with the stationary contacts 5 and 6 respectively. Suitable interlocking means generally indicated by the sliding bar 13, are provided for insuring proper sequence of operation of the circuit breaker contacts and the disconnecting contacts in a manner well known in the art. When the circuit breaker is to be moved to operative position, it is open and elevated so that the disconnecting contacts 11 and 12 engage the coacting disconnecting contacts 5 and 6 respectively, after which the circuit breaker may be closed. The reverse operation is carried out when the circuit breaker is to be disconnected and isolated with respect to the buses and feeders. The type of switch gear above described is well known in the art and the application of my improved grounding and testing apparatus thereto will be presently described. It shall of course, be understood that my invention is not limited to the drop-down type of metal clad switchgear, but is also applicable to the well known truck type switchgear wherein a switch unit is moved horizontally to connected and disconnected positions.

The grounding and testing apparatus for the buses and feeders comprises a removable testing unit 14 having a supporting frame 15 constructed of metallic angle members or the like and mounted on the rollers 16. The top portion 17 of the frame has mounted thereon and insulated with respect thereto a testing contact 18 supported by an insulating bushing 18' mounted on the portion 17, and a connection 19 including a current transformer 20, mounted on and insulated from an extension 21 of the frame. The connection 19 comprising a copper strip or the like is provided with a second testing contact 22 depending therefrom as illustrated in Fig. 1.

For the purpose of securing the testing unit in operative position with respect to the movable switch unit 2, the frame 15 at its rearward portion is provided with a supporting lug 23 adapted to be engaged by the flange 24 comprising part of the circuit breaker. A positioning lug 23' mounted on the frame 15 is likewise adapted to abut the outer end of the member 8 and thereby to hold the frame in proper position with respect to the switch unit.

The test equipment likewise comprises an auxiliary test contact 25 which is supported, and grounded in the present instance, with respect to the switch unit by the conducting strips 26 and 27 removably secured to the normally grounded metallic switch frame as by the bolts 28. Likewise, by way of example, the incoming cables may be tested as for proper phase rotation by removing the detachable conducting strips 26 and connecting a phase rotation meter to the circuit breaker studs at the disconnecting contacts 11 in a manner well known in the art. A secondary disconnecting device and relay generally indicated at 29 is mounted on the frame 15 for connecting the circuit breaker operating mechanism in a well known manner to a control source. The electrical connections between the breaker operating means, the secondary disconnecting device, 29, current transformers 20, etc. are not shown in Figs. 1 and 2 for the purpose of clarity, the diagrammatic connections shown in Fig. 3 hereinafter described being generally sufficient for an understanding of my invention.

When either the main buses or feeders are to be tested or grounded, the switch unit 2 is lowered and moved on its truck to a position outside of the stationary structure 1 as illustrated in Fig. 1. The testing unit 14 is thereupon rolled into the position shown wherein the testing contact 22 is in alinement with the disconnecting contact 12. The other disconnecting contact 11 is engaged by the testing contact 25, and in the event that the bus or feeder is to be grounded, the strip 27 is bolted as previously described to the grounded switch frame. With the apparatus in the position illustrated in Fig. 1, the circuit breaker is thereupon elevated slightly to move the disconnecting contact 12 into engagement with the testing contact 22 so that the supporting lug 23 is engaged by the flange 24 and the positioning lug 23' is opposite and in abutting relation with the member 8. The entire apparatus so connected is moved bodily towards the stationary frame 1 until the testing contact 18 is underneath and in alinement with the stationary contact connected to the portion of the circuit to be tested. In this position the apparatus is elevated by the circuit breaker elevating means 9, the test unit 14 being carried by the supporting lug 23 to an elevated position wherein the testing contact 18 engages the proper stationary disconnecting contact, as the contact 5 in the present instance wherein the buses are grounded through the circuit breaker 2. Each phase bus in this test position is accordingly connected directly to ground through a current transformer 20 and the oil circuit breaker thereby affording complete short circuit protection to the extent of the rated interrupting capacity of the breaker in the event that the bus is alive when grounded. It will be apparent that the same test conditions may be applied to the feeder connections by engagement of the test contact 18 with the stationary disconnecting contact 6. The disconnecting operation is performed in the same manner as in normal operation of the switch unit, the apparatus being lowered to disengage the testing contact 18 and rolled outwardly and away from the stationary structure 1 so that the testing unit may be readily removed and rolled away when not required.

In Fig. 3 there is shown a diagrammatic plan of the circuit breaker and test connections with respect to the main and control circuits. The individual phases of the main circuit 30 are, in the ground-test position of the apparatus, each grounded through the circuit breaker 2 and the testing connections 5—18, 22—12 and 11—25, a current transformer 20 being located if desired in each phase connection to ground for controlling the over-current relays 31 in case any of the main phase circuits are alive.

The circuit 32 of the control source has connected therein the closing relay 33, the circuit of which may be closed by the closing switch 34 when the circuit breaker 2 is in open position for bridging the contacts 35. The circuit breaker 2 may accordingly be closed by the switch 34 which causes actuation of the relay 33 to close the contacts 36 thereby energizing the circuit breaker closing coil 37 from the control source. In the closed position, the circuit breaker opens the circuit between the contacts 35 and completes the circuit between the contacts 38, thereby causing energization of the trip coil 39 which coacts with the latch 40 for releasing the breaker when either the opening switch 41 is closed, or any one of the relays 31 actuated to close the relay contacts associated therewith. Accordingly, when either a bus or feeder is grounded, the current transformer and associated relay, and the oil circuit breaker in the corresponding ground connection insure that a ground fault, if one exists, will be cleared without distress.

It shall be understood that my invention is not limited to specific details of construction and arrangement thereof herein illustrated, and that changes and modifications may occur to one skilled in the art without departing from the spirit of my invention.

What I claim as new and desire to secure by Letter Patent of the United States, is:

1. Electrical apparatus for metal clad switchgear including a stationary structure upon which buses and feeder connections are mounted and a circuit breaker bodily movable with respect to said stationary structure to connected and disconnected positions, said stationary structure and circuit breaker being provided with coacting disconnecting contacts, comprising a movable testing unit having testing contacts for engagement with said stationary and movable disconnecting contacts respectively, and means for mounting said unit on said circuit breaker for bodily movement.

2. Electrical apparatus for metal clad switchgear of the drop-down type including a stationary frame having a superstructure within which buses and feeder connections are mounted, an oil circuit breaker vertically movable with respect thereto to connected and disconnected positions, the stationary buses and feeder connections in said circuit breaker being provided with coacting disconnecting contacts, comprising a movable testing unit having testing contacts for engagement with said stationary and movable disconnecting contacts respectively, and means for suspending said unit from said circuit breaker so that elevation of said breaker is effective to cause engagement of said testing and fixed contacts.

3. Electrical apparatus for metal clad switchgear including a stationary structure upon which buses and feeder connections are mounted and a circuit breaker bodily movable with respect to said stationary structure to connected and disconnected positions, said stationary structure and circuit breaker being provided with coacting disconnecting contacts, comprising a movable frame having testing contacts for engagement with said stationary and movable disconnecting contacts respectively, said frame being provided with rollers for moving the same with respect to said circuit breaker, and means for securing said frame to said circuit breaker whereby bodily movement of said breaker is effective to cause engagement of said testing and stationary contacts.

4. Electrical apparatus for metal clad switchgear of the drop-down type including a stationary frame having a superstructure within which buses and feeder connections are mounted, an oil circuit breaker vertically movable with respect thereto to connected and disconnected positions, the stationary buses, feeder connections and said circuit breaker being provided with coacting disconnecting contacts, comprising a movable frame having testing contacts mounted thereon for engagement with said stationary and movable disconnecting contacts respectively, a supporting lug secured to said frame and adapted to be engaged by said circuit breaker for elevating the testing contacts connected to one side of said breaker with respect to said stationary contacts, and a testing contact for engagement with the disconnecting contact on the other side of said breaker.

5. Electrical apparatus for metal clad switchgear including a stationary structure upon which buses and feeder connections are mounted and a circuit breaker bodily movable with respect to said stationary structure to connected and disconnected positions, said stationary structure and circuit breaker being provided with coacting disconnecting contacts, comprising a movable frame, testing contacts mounted on said frame for engagement with said stationary and movable disconnecting contacts respectively, an electrical connection between said testing contacts including a current transformer, and a test contact for the other side of said circuit breaker adapted to be grounded to said circuit breaker frame.

6. In metal clad switchgear including a stationary structure on which buses and feeder connections are mounted and a circuit breaker bodily movable to connected and disconnected positions with respect to said structure, said circuit breaker and buses and feeder connections being provided with coacting disconnecting contacts, apparatus for testing either the buses or feeder connections through said circuit breaker comprising a movable frame adapted to be secured to said circuit breaker, testing contacts mounted on said frame and electrically connected to each other for engaging the disconnecting contact at one side of said breaker and the corresponding stationary disconnecting contact respectively, and a testing contact connected to the disconnecting contact on the other side of said breaker for testing or grounding purposes.

7. Electrical unit for grounding bus and feeder connections through an oil circuit breaker having an interrupting rating corresponding to the bus and feeder ground fault currents including a current transformer connected in the grounded connection, a relay controlled by said current transformer for causing opening of said grounding breaker whereby said breaker is effective to clear a ground fault in the event that said connections are alive and means for attaching said unit to said circuit breaker.

8. Electrical unit for grounding bus and feeder connections comprising an oil circuit breaker having sufficient interrupting capacity for grounding said connections therethrough, means for selectively connecting one terminal of said breaker to one of said connections, means for connecting the other breaker terminal to ground, a current transformer in the grounding breaker connection, and a relay controlled by said current transformer for causing opening of said breaker in response to fault current through said grounded connection, said unit being relatively movable with respect to said connections.

9. Electrical apparatus including stationary structure having power circuit connections, a switch unit movable with respect thereto having connections normally coacting with said circuit connections, and connecting apparatus establishing a circuit between said circuit connections and switch unit comprising a unit independently and detachably mounted on said switch unit.

In witness whereof, I have hereunto set my hand this 26th day of September, 1930.

ERNEST G. SWANSON.